(No Model.)

W. R. JENKINS.
RAKE.

No. 500,904. Patented July 4, 1893.

Witnesses
Chas. J. Williamson
Henry C. Hazard

Inventor
William R. Jenkins
by Pindle & Russell
his Attorney

UNITED STATES PATENT OFFICE.

WILLIAM R. JENKINS, OF BELLEFONTE, PENNSYLVANIA.

RAKE.

SPECIFICATION forming part of Letters Patent No. 500,904, dated July 4, 1893.

Application filed November 1, 1892. Serial No. 450,672. (No model.)

*To all whom it may concern:*

Be it known that I, WILLIAM R. JENKINS, of Bellefonte, in the county of Centre, and in the State of Pennsylvania, have invented certain new and useful Improvements in Rake-Heads and Processes of Making the Same; and I do hereby declare that the following is a full, clear, and exact description thereof, reference being had to the accompanying drawings, in which—

Figure 1:
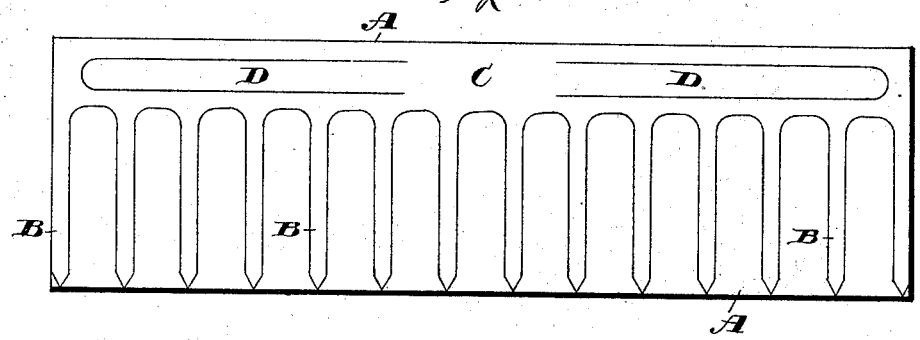
Figure 2:
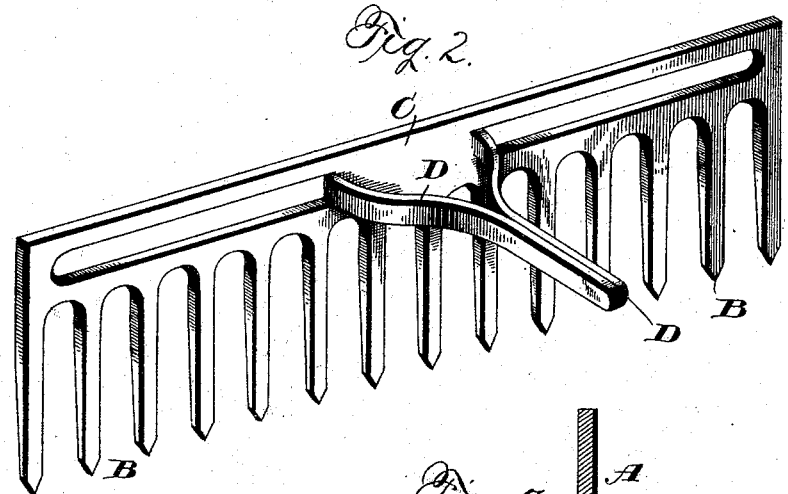
Figure 3:

Figure 1 shows a plan view of the blank strip cut to form a single rake head blank; Fig. 2 a perspective view of a rake head made from such blank; Fig. 3 a view of a transverse section of the blank strip shaped as I prefer it, and Fig. 4 a plan view of a blank strip, as cut to form two rake head blanks with their tang strips.

Letters of like name and kind refer to like parts in each of the figures.

The object of my invention has been to provide an improvement in rake heads and the process of making the same, and to this end my invention consists in the process and in the article produced thereby, as hereinafter specified.

My special purpose has been to produce, in the most economical manner, a good strong rake head for garden rakes, which shall have a straight back or body, with a plain upper edge for use in smoothing or leveling the ground and its tang for attaching it to the handle made integral with the body, and situated on the face of the latter, well below the upper edge thereof, so as to bring the line of draft as low down as possible and leave a plain straight portion of the body or back extending well above the tang, for use in the smoothing or leveling referred to above.

In carrying out my invention I take a straight strip A of iron or steel, preferably, but not necessarily rolled, which, where only one rake head blank is to be cut out, I prefer to have made in the shape indicated by the sectional view in Fig. 3, so as to secure the desired beveling of the rear sides of the teeth of the finished rake head, without grinding them off. Where two head blanks are to be cut from the same strip, in the manner indicated in Fig. 4, of course this beveling of the strip is impossible, and the latter is consequently in the form of a plain thin flat bar.

Figure 4:
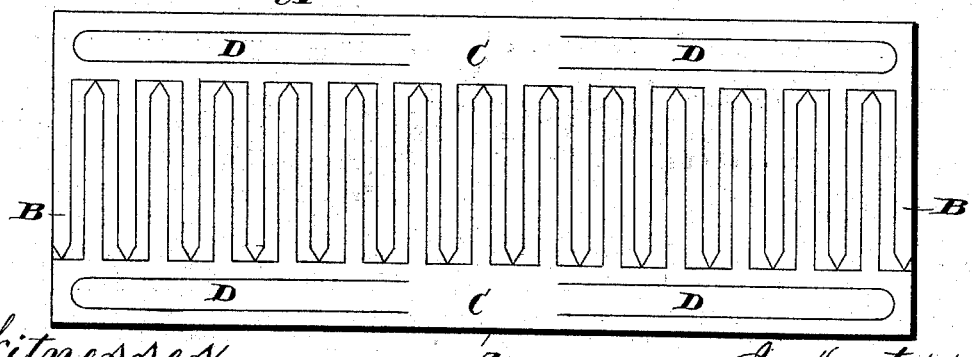

From the strip A I cut, by stamping or shearing, the desired rake head blank, having the teeth B B, the body or back C, and the tang forming tongues D D cut from the body below its upper edge. These tongues which are separated from the body or back, except at their inner ends, as indicated in the drawings, I then bend forward in a plane at right angles to the plane of the part C, so as to bring them together, and form from them a tang, as shown in Fig. 2, by which the rake head can be attached to any desired handle. After thus bending and bringing the tongues D together I prefer to weld them; but do not limit myself to so doing, for their parallel parts can be inserted and held in a suitable socket or ferrule on a handle, so as to make a good strong tang without any welding.

Where two rake head blanks are to be cut out of one strip, I economize in material by doing the cutting in the manner indicated in Fig. 4, so that the teeth in one blank will be cut from the parts of the strip A which are between the teeth of the other blank.

My process, as described, is simple and easily carried out, and is productive of a rake head which is most cheap and strong in construction; has its tang projection straight forward from the body or back of the rake, as near as possible to the teeth; and has a plain straight portion of its back above the tang, to be used in leveling or smoothing over the surface of the ground. The parts forming the tang are most strongly attached to the rake body, because the latter extends above as well as below the points where they are connected with it, and they are, in forming the tang, bent only in one plane, and in a direction in which they can best be bent without danger of breaking or being weakened at their bends.

Having thus described my invention, what I claim is—

1. The improved rake head consisting of the body carrying the teeth, and the attaching tang formed of tongues cut from such body, by longitudinal cuts below the upper edge thereof, so as to be connected with the same only at their inner ends, and having their unattached portions bent forward from the body and inward toward each other, so as to bring their outer portions together, substantially as and for the purpose specified.

2. The improved rake head consisting of the body carrying the teeth, and the attaching tang formed of tongues cut from such body by longitudinal cuts below the upper edge thereof, so as to be connected with the same only at their inner ends, and having their unattached portions bent forward from the body, and inward toward each other, so as to bring their outer portions in contact, and such portions welded together, substantially as and for the purpose described.

In testimony that I claim the foregoing I have hereunto set my hand this 15th day of October, 1892.

WILLIAM R. JENKINS.

Witnesses:
JOHN B. LINN,
J. H. LINGLE.